Patented Sept. 8, 1936

2,054,053

UNITED STATES PATENT OFFICE 2,054,053

PLASTIC MOLDING COMPOSITIONS

Harry A. Hoffman, Bloomfield, N. J., assignor to Bakelite Corporation, New York, N. Y., a corporation of Delaware No Drawing. Application April 2, 1935,
Serial No. 14,228

16 Claims. (Cl. 260—4)

This invention relates to plastic molding compositions which when subject to the combined action of heat and pressure in a mold yield hard finished articles. It relates particularly to such compositions that include synthetic resins of a heat-reactive type, i. e., resins which set up or harden under the action of heat to an infusible, insoluble state.

In the preparation of articles from heating-reactive resinous materials two distinct practices are followed; one is that of casting and the other is that of plastic or hot-press molding. In the casting procedure the resin is in a fused liquid condition and is poured into a mold; and while in the mold it is subjected to the action of heat (with or without the application of pressure through the medium of an inert gas) and the resin gradually solidifies. In a plastic molding operation a composition is when cold in a solid form and generally powdered; but the resinous content is fusible under the action of molding pressure and temperature to a restricted degree of flow such that the composition takes the conformation of the mold with a film of resin forming on the surface but it does not liquefy to the extent of oozing from normal mold openings. For a casting operation then reliance is placed upon the solidification of a fused resin into a homogeneous mass under the action of heat, and inert fillers are not required and generally cannot be included except to a very limited extent. In a plastic molding operation, however, a filler is commonly an essential ingredient, as the solid resin is not easily moldable into a homogeneous useful article without its addition, and it forms a very material part of the composition.

Resins intended for casting are, as a rule, not applicable for plastic molding compositions; this is due to the radically different demands in the casting and in the molding industries. For a casting operation the time cycle involved is not important and accordingly hardening of the resin in a mold can proceed at a slow rate of hours or even days. For a plastic molding composition the time cycle is of primary importance since expensive molds and presses are used; no plastic molding composition is acceptable to the trade that does not set up or harden in a small mold within a period of two minutes, and a further demand of the trade is a composition which can be discharged hot from the mold to thus obviate a separate cooling step of the mold. In addition the hot-molding industry requires a composition in which the resin flows to the surface of the article so as to give a uniform surface film that is largely free from "orange peel" or "dog skin" appearance and to impart a high gloss.

Resins intended for plastic molding are of a heat-hardening type which pass through a fusible soluble state before arriving at a final infusible and insoluble state. Resins prepared from phenol and formaldehyde are typical heat-hardening resins used for plastic molding; but in place of phenol substituted phenols can be used, such as cresol, xylenol, amyl phenol, resorcinol or their homologs, derivatives or their mixtures; and in place of formaldehyde other aldehydes and ketones having a reactive methylene or substituted methylene group can be used, such as paraformaldehyde, hexamethylenetetramine, furfural, acrolein or their homologs, polymers or derivatives. The resin-forming ingredients are combined in substantially equimolecular proportions or larger proportions of the methylene agent by the aid of an acid or basic catalyst such as hydrochloric acid, oxalic acid, borax, lime, caustic soda, etc. By the term resin is also intended such products in which modifying additions, as fatty oils, unsaturated compounds, etc. combine to form a homogeneous part of the resin.

For preparing a molding composition a heat-hardening resin in a fusible soluble state is mixed with a filler, generally fibrous as wood flour or asbestos, and thereupon the resin is carefully advanced by heating to a point where its flow imparts the desired flow to the whole mass; the plasticity of the mass is generally expressed in a practical unit such as a flow of 20 seconds in closing a standard cup mold at 2000 pounds pressure at about 150° C. To be practical a plastic molding composition must cease to flow in a definite time and temperature, as determined by the mold size and shape, and then to harden to such a degree that the molded article can be discharged hot from the mold without distortion or loss of shape. A test equivalent to the cup mold test is melting the fusible resin (before its incorporation with a filler) on a hot plate heated to 160° C. and noting the length of time for hardening; resins which do not harden to a rigid condition within 100 seconds are usually considered unsuitable for plastic compositions.

Plastic resinous compositions as supplied for hot-molding are basic in character; in other words sufficient alkaline material is included in the molding composition or used in the preparation of the resin so that the composition in condition for molding gives a basic reaction to thereby avoid corrosion of the molds, sticking of the composition in the molds, etc. But it has been found that, in order to impart the speed of molding practically required, at least 4 per cent of a basic catalyst, calculated to equivalent sodium hydroxide based on the weight of a phenol used in the preparation of a resin must be present; this is the minimum percentage for a molding speed within two minutes to produce articles of usual shape and size. With this amount of basic catalyst included there is, however, a decidedly objectionable color change in the resin during a hot-molding operation. This change not only restricts the colors available to comparatively dark colors but also requires an allowance for the color change in the preparation of the hot-molding composition.

In carrying out researches on plastic hot-molding compositions prepared with basic catalysts it has been observed that the percentage of base present in the composition has a decided effect upon sensitivity to change in color when exposed to heat or light or both; for alkaline catalysts the critical limit is approximately 3 per cent by weight of alkali or alkaline salt equivalent (calculated and expressed as weight of sodium hydroxide equivalent), though the exact point of alkalinity at which color change begins is slightly higher for resins prepared from substituted phenols than for resins prepared from phenol itself. Heat-reactive phenol resins made alkaline with not more than three per cent of alkaline equivalent are light in color and transparent as well as resistant to color change; they are therefore highly desirable for commercial usage where light and delicate color shades are needed. But as the rate of curing or setting up in a hot mold of plastic compositions made from such comparatively low alkaline content heat-reactive resins is very slow, and as the surface appearance and gloss is not comparable with that obtained with high alkaline materials, the low alkaline content heat-reactive resins have not found usage in commercial plastic molding operations.

The present invention combines substantial stability of color and freedom from color change with the properties of high molding speed, hot discharge and other trade requirements of plastic molding compositions. Compositions prepared in accordance with the present invention also yield good surface appearance and high gloss in the finished molded article comparable with the high alkaline compositions. The invention presents the further advantage that the compositions can be made with relatively low percentage of inert filler content to give useful molded articles characterized by translucency and even transparency while retaining the foregoing characteristics of moldability at high speeds, etc.

For the accomplishment of these objects the invention makes use of a low alkaline resin composition; thereby the stability of color and resistance to color change characteristic of such resins is obtained. The requirements of high molding speed, hot discharge, etc., are imparted to the composition in a wholly unexpected manner by including in the composition a proportion of relatively highly reacted resin in finely divided form. This added resin in itself does not form a moldable composition, for it can be in a state of reaction or advancement such that it has not the plasticity or flow under molding pressure and temperature necessary for producing a molded article; the requisite plasticity or restricted flow of the composition is supplied by the low alkaline heat reactive resin. The invention accordingly combines two resins, each of which by itself is unfitted for preparing commercial molding compositions, to achieve the hitherto unattained object of uniting speed of molding with color stability.

The invention involves the further discovery that the effectiveness of the more advanced or reacted resin constituent for any given proportion is increased by the fineness to which it is ground. For example relatively coarse resin particles of the order and size of ordinary fibers and fillers when fully reacted to an infusible condition are found to be of relatively little value; but when the same resin particles are ground to a fineness of 60 and preferably of 100 mesh or finer they impart molding speed even when present in relatively small amounts.

For a more complete disclosure of the invention specific examples herewith follow, the ingredients and proportions stated being merely illustrative and not definitive of any limitations to be placed upon the invention.

*Example 1.*—Approximately 1 mol. of crude xylanol (that is a tar acid fraction boiling within the range of 205 to 235° C.) and about 2½ mols of formaldehyde were reacted in the presence of about 0.1% of sodium hydroxide as a catalyst until the resinous product obtained solidified upon cooling but was fusible and soluble. This proportion of reactants forms what is commonly known as a one-step resin, as it is heat-hardenable without the addition of a hardening agent; it is, however, slowly reactive, requiring (when mixed with 32% of wood flour) about 4 minutes to set up in a hot-press mold. About 71 parts of this resin, dissolved in about 50 parts of alcohol as a solvent, was mixed with about 1% of stearic acid based on the weight of resin together with a slightly higher proportion of lime and a suitable proportion of pigment or dye. One part of this mixture was further heated so that the resin content thereof became substantially insoluble. Another equal part of the resin in solvent containing the same amount of stearic acid, lime and pigment was added to about 43 parts of alpha flock and the mixture kneaded to a homogeneous condition. The heat treated portion was then admixed, and the whole mass was subjected to distillation to remove the solvent, and heating of the composition was continued until the composition had the desired characteristic of restricted flow. The composition was charged into a mold in the form of a bowl and subjected to a pressure of about 1000 pounds per square inch and at an approximate temperature of 150° C. The article hardened within the period of one minute to the point where it could be discharged hot from the mold; the article showed no blistering, it had a high degree of surface gloss, and it was comparable to the customary molded articles in strength, etc. The article furthermore was translucent, from which color was substantially absent except that due to the added pigment, and this color was not changed appreciably by resin discoloration during a period of 10 hours under ultra-violet light.

*Example 2.*—As a further illustration of the technical effects of the present invention a comparison of specific compositions is given. 30 parts of wood flour and 70 parts of a low-alkaline heat-hardenable phenol-formaldehyde resin were mixed to a homogeneous condition and subjected on heated rolls to a temperature of 130° C. to advance the composition and make it suitable for molding; it was found that the composition required a molding period of 5 minutes to reach the required degree of hardness for hot discharge. The low alkaline resin was in this case made by reacting 100 parts of phenol with 100 parts of formaldehyde (37% solution) and 1 part of ethylene diamine as a catalyst; after 1 hour's reaction the mass was dehydrated, cooled and ground. A similar composition was prepared from the same resin and filler but using 30 parts of filler to 35 parts of the resin, and to this was added 35 parts of the same resin but substantially hardened in the form of fine particles; this composition when subjected to the same procedure required only one minute to reach the same degree of hardness in the mold. In other words by dividing the resin into two equal portions and hardening one of those portions the molding time was reduced from 5 minutes to one minute, thus bringing the composition within the commercial speed range.

*Example 3.*—A resin was made by reacting 1 mol. of a mixed cresol (a fraction boiling between 190 and 212° C.) with 1 mol. of formaldehyde (40% solution), using 3 parts of 28% ammonium hydroxide per molar weight of cresol as a catalyst. This was reacted to the point of separation from the water layer, neutralized with phosphoric acid and the reaction mixture dehydrated under vacuum to a solid resin. A one-half portion of this resin was blended with an equal weight of ground wood flour and hardened by heating for 30 minutes at 140° C. The hardened composition was then ground to pass a hundred mesh screen. The remaining half portion of the resin was blended with the ground hardened composition together with wood flour, pigments, 1% lime and lubricant in proportions to give a 60% resin and 40% filler molding composition. The composition was rolled on differential rolls at 120 to 130° C. until the proper flow-point was reached; it was then cooled and ground to pass a 60 mesh screen. The ground powder molded in a time cycle of 2 minutes at 145° C. and molding pressure of about 1000 pounds per square inch to a very light colored, unblistered and usable molded product.

The proportion of advanced or processed resin to the relatively unadvanced or fusible resin can be varied over a wide range. Results which have been obtained indicate that the processed resin can form from 10 to 80 per cent of the total resin content when that resin is in a completely infusible condition or it may form from 5 to 95 per cent by weight of the resin content if it is not fully reacted to the infusible state but softens somewhat under molding pressure and temperature. It is immaterial whether the processed resin is pure or contains admixed pigments, fillers, dyes, etc. except that due allowance is to be made for any inert material present in the resin. Furthermore the usual types of fillers such as wood flour, fibers, etc. may be incorporated in the mixture and included in laminated, woven, fibrous or particle form. Fillers can be used in quantities up to 30 per cent of the weight of the composition and yet yield a translucent or partially transparent molded article; in higher percentages opaque articles are produced.

An especially interesting modification of this invention is that by which synthetic mixtures which are light resistant, but highly acidic and therefore damaging to a metallic mold, may be molded with freedom from injurious consequences to the mold. To effect this, low alkaline content "non-corrosive" phenolic resins are used as a binder or agglomerating agent for the powdered highly acidic "corrosive" resins. For example, substantially hardened urea formaldehyde resin in fine granular form is mixed with a low alkaline phenolic resin and the mixture processed with fillers, etc. This modification permits of using highly acidic condensation products without the use of especially resistant molds or changes in the molding technique, and is of special advantage in commercial work in which a molded product is to be made from several different compositions. Specific illustrations follow.

*Example 4.*—A resin was made from 1 mol. of glycerine and 2 mols of phthalic anhydride by reacting at 200° C. and allowing the water to escape; equivalent polybasic acids and polyhydric alcohols can be substituted as is well known in the art. The resin was heated until a condition of infusibility at 160° C. was reached. It was ground and substituted for the hardened phenol-formaldehyde composition in Example 3. A light colored molding mixture which hardened in two minutes at 160° C. under applied molding pressure was obtained.

*Example 5.*—A resin was made from 1 mol. of urea and 1½ mols of formaldehyde using a small amount of basic magnesium carbonate as catalyst; substituted ureas and other aldehydes can be used instead. This was mixed with 50 grams of alpha pulp, and the mass was acidified with citric acid; it was then dehydrated to a resinous solid under vacuum, and the solid content hardened by heating for 10 minutes at 130° C. whereupon it was ground to pass a 100 mesh screen. This hardened resin mass was used in place of the hardened phenol-formaldehyde resin mass in Example 3. A light colored molding mixture was obtained which hardened in two minutes to a hard, non-blistering shape at 150° C. in a pressure mold.

In the above references the permissible percentages of basic catalyst in the molding composition are recited for obtaining heat and light stable colors of the bonding medium. But excessive amounts of base can be used in preparing the initial resins provided the excess of base be subsequently neutralized in part so as to come within the limits set. It is also permissible to add small amounts of base to compositions containing slightly basic, neutral or acidic resins up to the critical limits for color sensitivity.

The foregoing examples illustrating the invention make use of one-step slowly reactive resins as binding agents. The invention, however, also lends itself to the use of "two-step" resins prepared from relatively non-hardening resins or novolaks and hardening agents. Heretofore novolaks have been given heat-hardening and molding-speed properties by means of hexamethylene-tetramine which includes an alkaline catalyst; the alkaline content is thereby present in excess of the amount found to be critical as to color change and stability. In place of hexamethylenetetramine hardening agents without any catalytic addition, such as paraformaldehyde and other solid or liquid forms of aldehydes and equivalent agents, can be substituted by means of this invention to yield compositions characterized by substantial freedom from color and from color change.

The invention herein set forth is not dependent on the character of the agent used to impart basicity. Sodium hydroxide is typical and commonly used for promoting resin reactions. But ammonia, alkali metal and alkaline earth hydroxides generally and their salts or salts engendering bases can be substituted. These types of basic catalysts are known in the art, and the particular catalysts that are herein mentioned specifically are not to be regarded as part of this invention or as limitations restricting the scope of the appended claims.

What is claimed is:

1. Plastic composition for hot-press molding comprising an inert filler and a binder for the filler, said binder including a heat-reactive resinous product prepared from a phenol and a reactive methylene-containing agent and containing substantially not more than three per cent of a basic agent, expressed as sodium hydroxide equivalent based on the weight of the phenol used, said product being in an arrested stage of reaction characterized by a restricted flow of the composition under molding pressure and temperature sufficient for filling a mold without oozing therefrom, and a finely divided heat-reacted resinous product of insufficient flow under molding pressure and temperature to act as a binder and constituting approximately 5 to 95 per cent of the resinous content of the composition, said composition being characterized by commercial molding speed and substantial stability of color.

2. Plastic composition for hot-press molding comprising an inert filler, a heat-reactive resin in a state of fusibility and prepared from a phenol and a reactive methylene-containing agent, said resin containing substantially not more than three per cent of a basic agent, expressed as sodium hydroxide equivalent based on the weight of the phenol used, and having admixed therewith a heat-reacted resin of comparative infusibility, said composition being characterized by commercial molding speed and stability of color.

3. Plastic composition for hot-press molding comprising a filler and a binder therefor of a relatively unadvanced heat-reactive resin in fusible form prepared from a phenol and a reactive methylene-containing agent and an alkaline content of substantially not more than three per cent, expressed as sodium hydroxide equivalent based on the weight of the phenol used, in admixture with a relatively advanced resin of insufficient fusibility under molding pressure and temperature to act as a binder, said composition being characterized by commercial molding speed and substantial stability of color.

4. In a plastic composition for hot-press molding including in admixture a heat-hardening resin prepared from a phenol and a reactive methylene-containing agent and having an alkaline content of substantially not more than three per cent, expressed as sodium hydroxide equivalent based on the weight of the phenol used, and a second resin of insufficient flow under molding pressure and temperature to act as a binder and present in amount to impart commercial molding speed to the composition.

5. Composition according to claim 4 in which the second resin is a heat-reacted resin prepared from a phenol and a reactive methylene-containing agent.

6. Composition according to claim 4 in which the second resin is a heat-reacted resin prepared from a urea and an aldehyde.

7. Composition according to claim 4 in which the second resin is a heat-reacted resin prepared from a polyhydric alcohol and a polybasic acid.

8. Composition according to claim 4 in which the second resin is in a state of subdivision of 60 mesh or finer.

9. Composition according to claim 4 in which the second resin constitutes from 5 to 95 per cent of the resin content of the composition.

10. Composition according to claim 4 in which the second resin is in a state of reaction characterized by infusibility under molding pressure and temperature and constituting from 10 to 80 per cent of the resin content.

11. Plastic composition for hot-press molding comprising a filler and a resin prepared from xylenol and formaldehyde in proportions forming a heat-reactive resin, said resin having an alkaline content substantially not in excess of three per cent, expressed as sodium hydroxide equivalent based on the weight of xylenol, a portion of said resin being advanced by heating to a state of comparative infusibility under molding temperature and pressure.

12. Plastic composition for hot-press molding comprising a filler and a resin prepared from a phenol and a reactive methylene-containing agent in proportions to form a heat-reactive resin, said resin having an alkaline content substantially not in excess of three per cent, expressed as sodium hydroxide equivalent based on the weight of the phenol used, a portion of said resin being advanced by heating to a state of comparative infusibility under molding temperature and pressure.

13. Process of preparing a hot-press molding composition characterized by commercial molding speed from a slowly heat-reactive resin prepared from a phenol and a reactive methylene-containing agent without increasing the basic content of the composition substantially beyond three per cent, expressed as sodium hydroxide equivalent based on the weight of the phenol used, which comprises heat-hardening a portion of the resin to a state incapable of sufficient flow under molding temperature and pressure to act as a binder, comminuting the hardened resin to a fineness of 60 mesh or finer, and incorporating the comminuted resin with the unhardened portion of the resin.

14. Process of preparing a hot-press molding composition characterized by commercial molding speed from a slowly heat-reactive resin prepared from a phenol and a reactive methylene-containing agent without increasing the basic content of the composition substantially beyond three per cent, expressed as sodium hydroxide equivalent based on the weight of the phenol used, which comprises heat-hardening a heat-reactive resin to a state incapable of sufficient flow under molding temperature and pressure to act as a binder, comminuting the hardened resin to a fineness of 60 mesh or finer, and incorporating the comminuted resin with the slowly heat-reactive resin.

15. In a process of preparing a hot-press molding composition characterized by commercial molding speed from a slowly heat-reactive resin prepared from a phenol and a reactive methylene-containing agent without increasing the basic content of the composition substantially beyond three per cent, expressed as sodium hydroxide equivalent based on the weight of the phenol used, the step which comprises adding thereto a heat-hardened resin reacted to a state incapable of sufficient flow under molding temperature and pressure to act as a binder.

16. Article molded by heat and pressure from a resinous composition prepared from a resin derived from a phenol and a reactive methylene-containing agent and having an alkaline content substantially not in excess of three per cent by weight expressed as sodium hydroxide equivalent based on the weight of the phenol used, and a heat-hardened resin reacted to a state incapable of sufficient flow under molding temperature and pressure to act as a binder and present in amount sufficient to impart commercial molding speed, said article being characterized by substantial absence of color and freedom from color change attributable to the resin.

HARRY A. HOFFMAN.